Dec. 8, 1964  R. M. KIEHN  3,160,750
NUCLEAR RADIATION MEASURING SYSTEM UTILIZING A RADIO RECEIVER
Filed Dec. 26, 1961

INVENTOR
ROBERT M. KIEHN

BY Donald E. Payne
ATTORNEY

United States Patent Office 3,160,750
Patented Dec. 8, 1964

3,160,750
NUCLEAR RADIATION MEASURING SYSTEM UTILIZING A RADIO RECEIVER
Robert M. Kiehn, Los Alamos, N. Mex.
(129 Palmo Drive, Luling, Tex.)
Filed Dec. 26, 1961, Ser. No. 161,926
11 Claims. (Cl. 250—71.5)

This invention relates to a radiation intensity measuring system using radio frequency techniques and it pertains more particularly to a device for use in conjunction with home or community fall-out shelter radio receiving sets for enabling the latter to indicate nuclear radiation intensity.

The U.S. Department of Defense—Office of Civilian Defense document BC-14527 sets forth ten specifications for a radiation dose ratemeter for use in home and community fall-out shelters which are designated "essential" and thirteen additional specifications which are designated "desirable." An object of my invention is to provide a ratemeter that will fully meet or exceed the ten essential requirements and will substantially meet or exceed the thirteen supplemental desirable requirements. It appears that no prior meter for determining radiation intensity could meet all of the essential requirements of BC-14527, much less the desirable requirements, in spite of the large amounts which have been allocated and/or spent in efforts to devise such a device.

More specifically, my object is to provide a small, rugged, all-solid-state, substantially foolproof, battery operated, low voltage, low power requirement, low cost device which can co-operate with any AM radio receiver to enable radiation intensity to be indicated by the frequency scale on said radio receiver when the tuning knob is turned to such a position that a certain tell-tale tone signal is produced. Other objects of the invention will become apparent as the detailed description of the invention proceeds.

In accordance with my invention, a nuclear ratemeter device co-operates with an ordinary radio receiver so that when said receiver is turned on with the device in close proximity thereto and the tuning knob is turned until a tell-tale tone is heard, the frequency shown by the scale will indicate the intensity of the incident radiation to which the device is exposed. The device is preferably either incorporated into the radio receiver structure itself or is a separate device positioned adjacent thereto. The device is openable at one end to receive a low voltage dry battery but it is preferably otherwise closed and/or sealed since no adjustment thereof should be necessary. Between the positive and negative battery terminal connections I provide:

(a) A radiation-sensing cell of high resistance at low radiation intensity and whose resistance decreases with increasing radiation intensity.

(b) A semi-conductor, variable capacitance, junction diode and connections for varying the voltage across said diode in response to changes in resistance of said radiation sensing cell and hence in response to changes in radiation intensity.

(c) A tuned oscillator circuit for generating a RF carrier, the frequency of which is determined by the capacitance of the diode, and (d) A tone modulator system, which may include at least most of the oscillator circuit, and which produces a tone-modulated signal having a frequency in the range of 550 to 1700 kc. whereby said frequency may be determined by the tuning dial of an adjacent radio receiver.

The invention will be more clearly understood from the following detailed description of a preferred example read in conjunction with the accompanying drawing which forms a part of this specification and in which.

Figure 1:
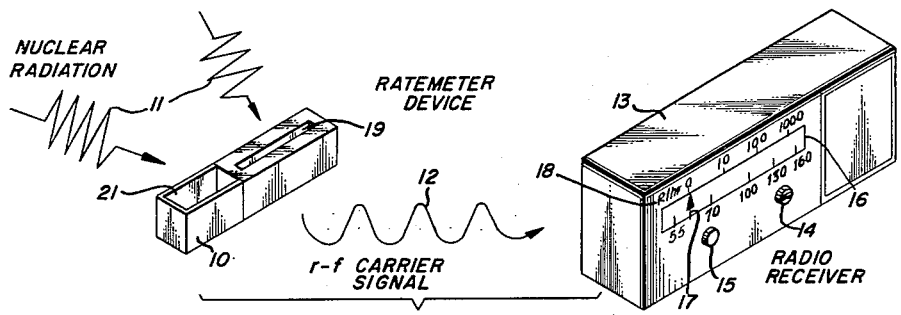
FIG. 1 is a diagrammatic showing of the ratemeter device supplemented by a radio receiver.

Referring to FIG. 1, when my ratemeter device 10 is exposed to nuclear radiation energy such as gamma rays 11, it generates a tone-modulated radio-frequency carrier signal 12 which is picked up by a radio receiver 13 when the "off-on" switch 14 thereof is in "on" position and the tuning knob 15 is turned to the frequency of signal 12. The frequency of carrier signal 12 is a function of the intensity of nuclear radiation 11. The radio receiver has a frequency scale 16 with the lowest scale mark designated 55 or 550 (meaning 550 kc.) and the highest scale mark designated 160 or 1600. Modern radio receiver scales also usually have markers at about 640 kc. and on 1240 kc. to designate the Conelrad frequency which is to be used in case of war when said radio, which is preferably battery operated, is employed in a home or community fall-out shelter. My ratemeter device 10 may be so designed and calibrated that the intensity of the nuclear radiation can be measured by simply turning knob 15 until a tell-tale tone is heard and then noting the reading of pointer 17 on scale 16. This scale may have, in addition to the frequency scale, a scale 18 indicating the Roentgen per hour (R./hr.) of radiation to which device 10 is exposed. Alternatively a legend 19 may be inscribed on device 10 showing the R./hr. for each frequency from 550 to 1600 kc., or a scale calibrated in both frequency and R./hr. corresponding to scale 16 of FIG. 1.

Figure 3:
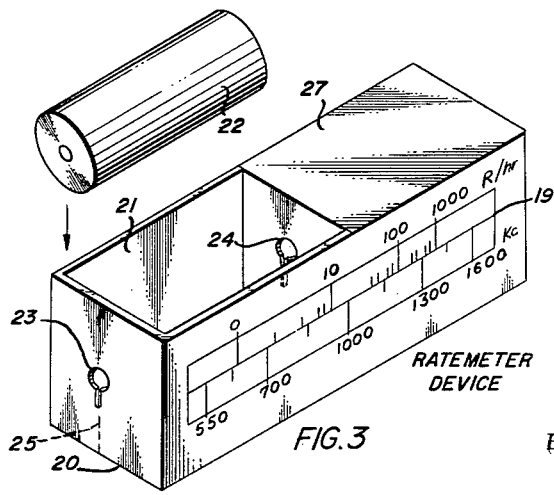
FIG. 3 is a schematic showing of the device itself.

Referring to FIG. 3, my ratemeter device 10 in this example consists essentially of a case 20 of material such as polyethylene, polystyrene or other rugged and substantially non-conducting plastic material, said case 20 being provided with an open or openable compartment 21 for receiving a miniature battery which may be 1.5 to 30 volts and which in this case is 15 volts. The battery is mounted between electrical contacts 23 and 24, the former being the positive or plus terminal and the latter being the negative or minus terminal. Conductors 25 and 26, which form a part of the electrical system, lead from contacts 23 and 24 respectively to elements which are preferably mounted in a closed or normally inaccessible compartment 27 in case 20. The device may have outside dimensions of 1" by 1" by 4" or less, including the space for the battery; the electrical circuit may only require a space of about one cubic inch.

Figure 2:
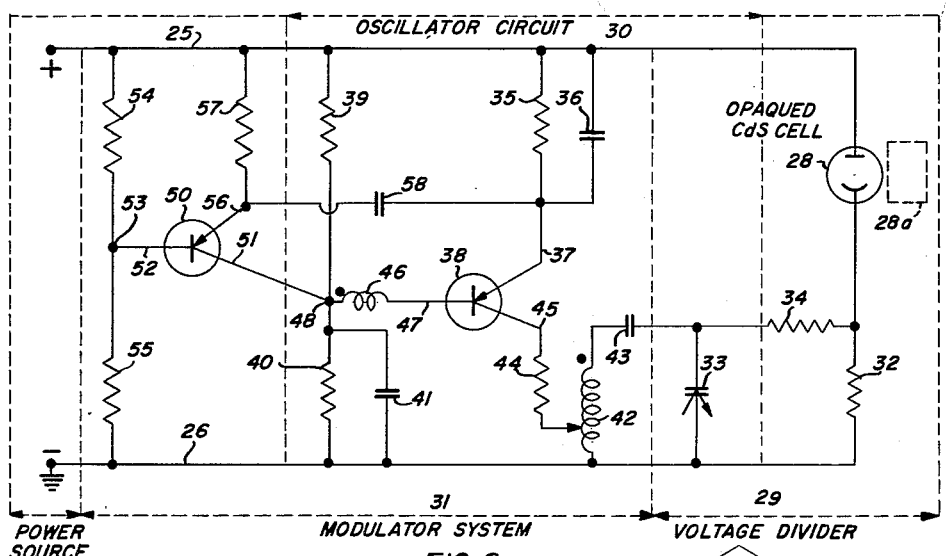
FIG. 2 is a wiring diagram of the device.

Referring to FIG. 2 it will be noted that the electrical system consists essentially of power source connections 25 and 26, a radiation-sensing cell 28, a voltage divider circuit 29 which includes said cell and a connection to a solid state, semi-conductor, variable capacitance, junction diode, a transistorized oscillator circuit 30, which includes said diode, and a transistorized modulator system 31 which in this example includes at least most of the elements of the oscillator circuit. Insertion and removal of the battery may take the place of a switch which might otherwise be required.

The radiation-sensing cell 28 in this example is a solid state, cadmium sulfide, semi-conductor, photocell such as a Clairex 505L (NOTE.—L. E. Hollander, Nucleonics 14 No. 10, p. 68—1956) which is shielded from light by a metal cap or an opaque film. A scintillator 28a may be employed with the photocell if desired, but is not essential. (NOTE—R. K. Swank, Annular Review of Nuclear Science, 4, p. 111—1954.) Generally speaking, radiation-sensing cell 28 has a high resistance, i.e. of the order of about 100 megohms in the absence of nuclear radiation, and its resistance should decrease as a function of increasing radiation to which the device is exposed. When exposed to 10 R./hr. its resistance may be about 10 megohms; at 100 R. per hr. it may be about 1 megohm and at 1000 R. per hr. about .1 meoghm. While an opaque CdS cell is preferred, other radiation-sensing elements may be employed which have high resistance and which decrease in resistance with increases in nuclear radiation to which it is exposed.

The voltage divider 29 includes the radiation-sensing cell 28, a connection from one side of the cell to line 25, a connection from the other side of the cell to range resistor 32 and thence to ground or line 26. A solid-state, semi-conductor, variable-capacitance, junction diode 33 such as a Varicap (NOTE—Varicap, research and development, 1958, Pacific Semi-conductors, Inc.) is shunted by said range resistor 32 through a radio frequency blocking resistor 34. The D.C. voltage across the junction diode capacitor 33 is determined by the D.C. voltage across the terminals of range resistance 32, and this in turn is determined by and proportional to the current flow permitted through radiation sensing cell 28. The D.C. voltage across the junction diode capacitor 33 determines the effective capacity of the element. Thus the voltage divider determines a capacity for capacitor 33 which is a function of, and hence varies with, the intensity of radiation 11.

Considering the back resistance across the terminals of Varicap 33 to be the signal input resistance to the transistor circuitry, such input resistance is about 100 megohms or more.

The oscillator circuit 30 may be any one of many known circuits for obtaining an RF carrier. (NOTE—L. P. Hunter, Handbook of Semiconductor Electronics, p. 14–3 and 14–4, McGraw-Hill—1956). In this example it is an L–C tuned circuit in the RF range. A self-bias resistor 35 and capacitor 36 connected in parallel therewith are connected between line 25 and the emitter lead 37 of an RF transistor 38. There is a D.C. forward bias arrangement of resistors 39 and 40 and capacitor 41, which is in parallel to resistance 40. There is an L–C tuned resonant circuit consisting of inductance 42, padder capacitor 43 and resonant tuning capacitor 33. The tuned circuit may be connected through a power limiting resistor 44 to the collector electrode 45 of RF transistor 38, although this is not always necessary. The feedback coil winding 46 of the tuned circuit inductance supplies feedback by being connected between the base lead 47 of transistor 38 and the forward bias terminal point 48 of the forward bias arrangement 39, 40 and 41. The oscillator sub-system is connected between lines 25 and 26 and it radiates or transmits a carrier frequency determined by L.C. combination: 42, 43 and 33. Since the capacity of Varicap 33 is related to the intensity of radiation on cell 28, the carrier frequency generated by the system, can be said to be a function of such intensity of radiation.

The modulator system 31 may be any one of the many known circuits for tone-modulation an RF carrier frequency. It has an emitter-coupled multivibrator arrangement (NOTE—Hunter's Handbook supra p. 14–23) of an audio transistor 50 and RF transistor 38. The collector lead 51 of audio transistor 50 is connected to the bias terminal point 48 of the first forward bias arrangement. The base lead 52 is connected to forward bias terminal 53 of a second forward bias arrangement consisting of resistors 54 and 55. The emitter lead 56 is coupled to emitter resistor 57. The emitter leads 56 and 37 are coupled together by capacitor 58 which in this example is of such value that the multivibrator action occurs at about 1000 cycle/sec. rate. The RF transistor 38 serves a dual purpose as both an oscillator/transmitter and as the second transistor of the multivibrator pair. The RF oscillator is thus turned off and on at about 1000 cycles per second rate producing a tone-modulated RF carrier frequency which is a function of the incident radiation intensity.

While the described tone-modulated RF signal may be detected by any known frequency-selective device, I prefer to employ the common, commercial-broadcast-band radio receiver, preferably one which is battery operated so that it will be useful in home or community fall-out shelters. As above stated, the tuning dial of the radio may be marked to show the R./hr. corresponding to various frequency lines so that nuclear radiation intensity may be read directly, or the R./hr.-frequency relationship may be indicated on ratemeter service 10 or elsewhere.

In the foregoing example the various components are as follows:

| Ref. Character | Item | Characterized by |
| --- | --- | --- |
| 28 | CdS cell | Clairex 505L. |
| 32 | Range resistance | 10 Megohms. |
| 33 | Variable capacitor | Varicap V82. |
| 34 | Resistance | 5M (M is megohms). |
| 35 | do | 3.31K (K is kilo-ohms). |
| 36 | Capacitor | .002 mf. |
| 38 | Transistor | r-f (2N1526). |
| 39 | Resistance | 15K. |
| 40 | do | 68K. |
| 41 | Capacitor | .05 mf. |
| 42 | Inductance | 270 mh (microhenrys). |
| 43 | Capacitor | .01 mf. |
| 44 | Resistance | 22K. |
| 50 | Transistor | audio (2N408). |
| 54 | Resistance | 4.7K. |
| 55 | do | 150K. |
| 57 | do | 3.3K. |
| 58 | Capacitor | 0.1 mf. |

The tuning inductance 42 may be adjusted to give 640 kc. at zero R./hr. and the range resistor 32 may be adjusted to give 1240 kc. at 100 R./hr. The frequency in each case is indicated by the position of the pointer when the tell-tale tone is heard. The ratemeter device 10 is preferably kept close to the radio receiver, which is usually portable. It may be used at a distance of 2 to 20 feet from the radio receiver and even further therefrom by modifying the circuit to employ an antenna, employing more power in the oscillator circuit, etc. The magnitude of the range resistance can be mathematically determined for various radiation-sensing cells, junction diodes and other elements of the system so that the frequency range of generated carrier signals will be in the range of 550 to 1600 kc. regardless of the amount of radiation encountered. I may employ a circuit which will give a tone at 640 on the dial when no radiation is encountered, a tone at 1240 for 100 R./hr. (Conelrad frequencies) and the intermediate scale can then be calculated. The reading will always be substantially accurate for a long battery life because of the minute amount of current consumed. An important feature is the low cost of the ratemeter device: In mass production it should be well under $10 per device and the cost may be reduced to half that amount.

Figure 4:
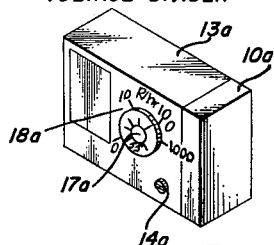
FIG. 4 shows the device as an integral part of a radio receiver.

As shown in FIG. 4, the radiation-sensing device 10a may be built into a portable radio such as a transistorized radio 13a. The power for the device may be supplied by the battery which powers the radio, and if desired the circuitry for the two may be combined. When switch 14a is "on" and tuning knob is turned to a frequency on scale 16a, which results in the telltale tone, the pointer 17a will also indicate directly on another scale 18a the intensity of the radiation incident on the device.

While a particular example of my invention has been described in great detail, my invention is of course not limited thereto since alternative circuitry and arrangements will be apparent from the foregoing description to those skilled in the art.

I claim:

1. A radiation ratemeter device for use with and adjacent to a radio receiver adapted to be tuned to frequencies of about 550 to 1600 kc., which device comprises in combination: A low-voltage power source, a solid-state, radiation-sensing cell having a high resistance when not exposed to radiation and a lower resistance when exposed to radiation, the cell having a resistance which is a function of incident radiation to which it is exposed, a voltage divider which includes said cell, a solid-state, semiconductor, variable-capacitance, junction diode connected to said voltage divider, an oscillator circuit which includes a first transistor which generates an R-F carrier, and a modulator system which includes both said transistor and a second transistor and which tone-modulates the R-F carrier so that when the radio receiver is tuned to obtain a tell-tale tone, the frequency shown on the scale thereof will indicate the intensity of said radiation.

2. The device of claim 1 in which the radiation is nuclear radiation comprising gamma rays and the cell is a cadmium sulfide photocell which has been screened from light.

3. The device of claim 2 which includes a scintillator adapted to cooperate with said cell.

4. The device of claim 2 wherein the low voltage is in the range of about 1.5 to 30 volts.

5. The device of claim 1 built into a portable radio receiver.

6. A low-voltage, battery operated, radiation-intensity, ratemeter device of which all components are solid-state components, which device comprises:
  (a) a radiation-sensing cell of high resistance with low radiation intensity and decreasing resistance with increasing incident radiation intensity,
  (b) a semi-conductor, variable capacitance, junction diode and connections for varying the voltage across said junction diode in response to changes in resistance of said radiation-sensing cell and hence in response to changes in radiation intensity,
  (c) a tuned oscillator circuit for generating a R-F carrier the frequency of which is determined by the capacitance of the junction diode,
  (d) and a tone modulator system which includes at least most of the oscillator circuit and which produces a tone-modulated signal having a frequency in the range of 550 to 1600 kc.
whereby said frequency may be determined by turning the tuning knob of an adjacent radio receiver until a tell-tale tone is received, the frequency thus determined indicating the intensity of radiation to which the device is exposed.

7. The device of claim 6 in which the cell is a CdS photocell shielded from light.

8. The device of claim 6 in which the back resistance across the terminals of the junction diode is at least 100 megohms.

9. A transistorized circuit in which the signal input resistance is at least 100 megohms.

10. A radiation intensity ratemeter device which comprises:
  (a) a radiation-sensing cell
  (b) a voltage divider circuit connected thereto
  (c) a semi-conductor, variable capacitance junction diode connected so that its capacity changes with different levels of radiation intensity to which the radiation-sensing cell is exposed
  (d) a tuned network of which the junction diode is a part so that the frequency of said network is dependent on the level of said radiation intensity, and
  (e) a modulator for producing from said frequency a tone-modulated signal in the radio broadcasting band for radiation intensities in the range of zero R./hr. to 1000 R./hr.

11. A device for measuring radiation intensity which comprises a solid-state, semiconductor, radiation-sensing cell whose resistance is high and is decreased with increase in the intensity of radiation to which it is exposed, a low voltage battery circuit including said cell and a range resistor connected in series, a solid-state, semi-conducting, junction diode capacitor connected to the circuit so that its capacity changes with current change through the cell and hence with changes in radiation intensity, an oscillating circuit including said capacitor for generating a carrier signal, the frequency of said signal being dependent on the capacity imposed by the variable capacitor and being in the range of 550 to 1600 kc. due to the range resistor, and a modulator for tone-modulating the carrier signal so that its frequency can be determined by a radio receiver.

References Cited by the Examiner

UNITED STATES PATENTS

| | | | |
|---|---|---|---|
| 2,839,678 | 6/58 | De Witz | 250—83.3 |
| 2,957,081 | 10/60 | Chapman | 250—83.3 |
| 3,061,724 | 10/62 | Reich | 250—83.3 |

OTHER REFERENCES

The Use of Standard Broadcast Receivers as Radioactive Indicators, by W. D. Schafer, AECD 2310, Declassified September 21, 1948.

RALPH G. NILSON, *Primary Examiner.*

ARCHIE R. BORCHELT, *Examiner.*